March 18, 1958      G. S. DOMAN      2,827,251
AIRCRAFT FRAME WITH LARGE SIDE OPENINGS
Filed April 2, 1952      2 Sheets-Sheet 2
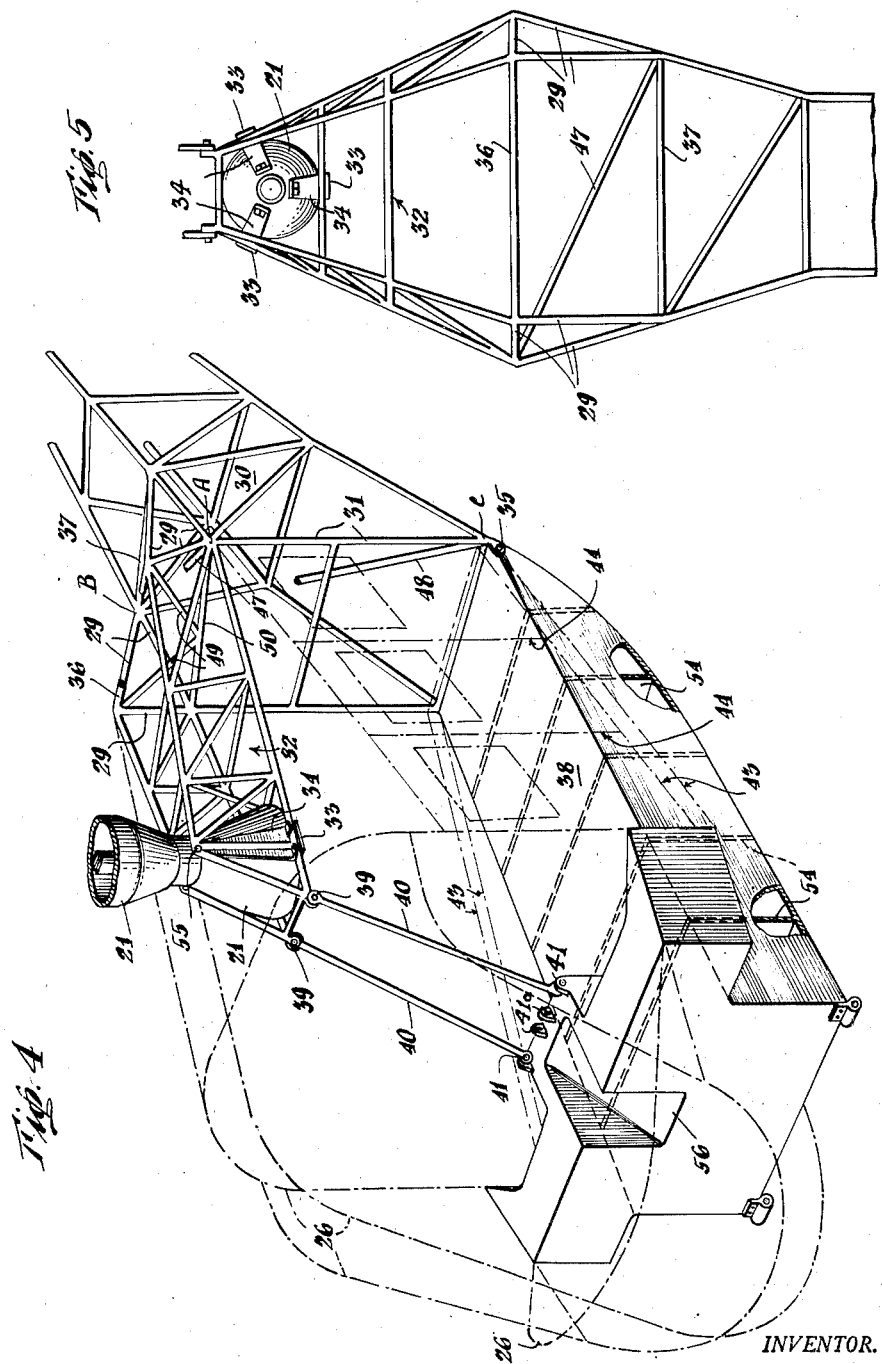
INVENTOR.
Glidden S. Doman
BY
Bohleber, Jasset & Montstream
ATTORNEYS United States Patent Office 2,827,251
Patented Mar. 18, 1958

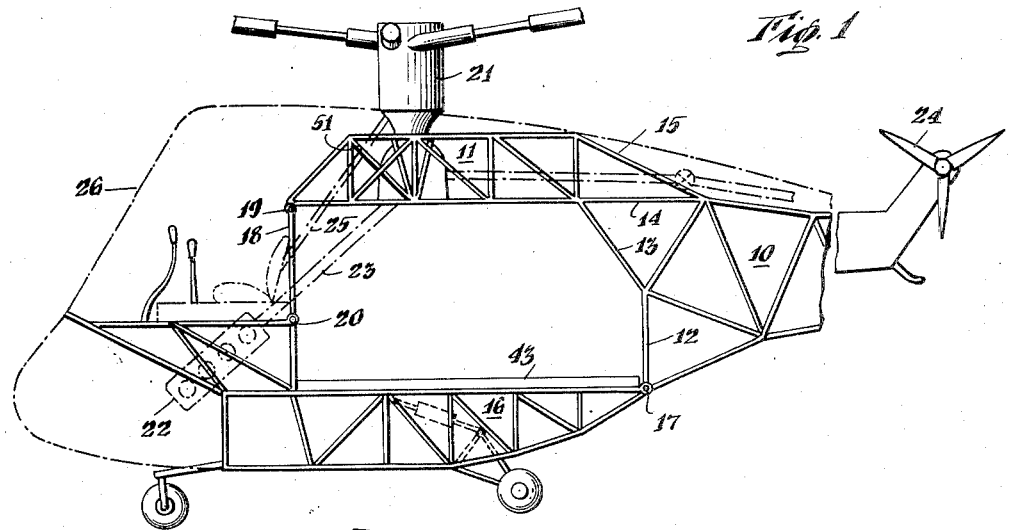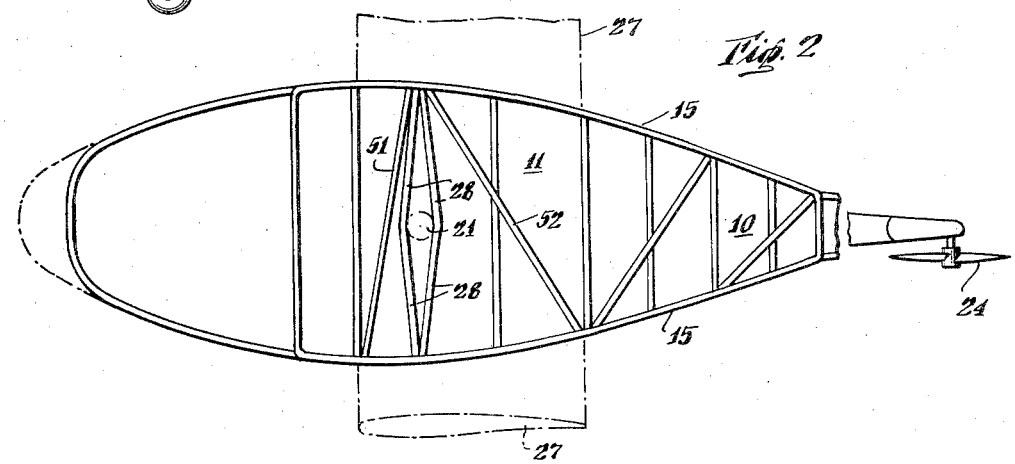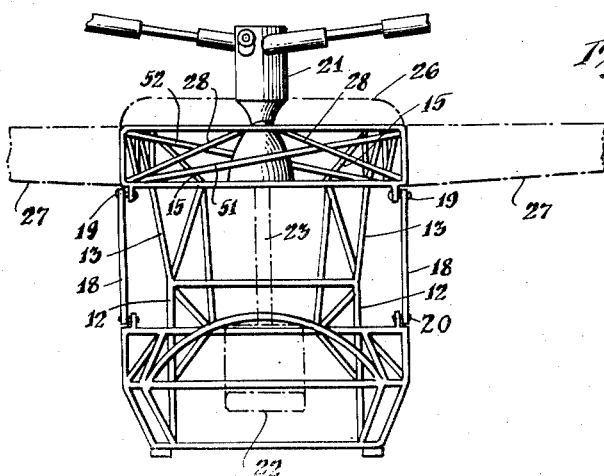

2,827,251

AIRCRAFT FRAME WITH LARGE SIDE OPENINGS

Glidden S. Doman, Trumbull, Conn., assignor to Doman Helicopters, Inc., Danbury, Conn., a corporation of Delaware Application April 2, 1952, Serial No. 280,145

15 Claims. (Cl. 244—119)

The invention relates to a frame for an aircraft and the aircraft which provides a large sized side area without obstruction or braces as an entry way or opening into the cargo space or cargo cabin. This unobstructed side area can be opened fully so that large dimensioned cargo may be easily inserted into the cargo space but of greater importance loaded stretchers can be put into the cargo space without removing the patients or occupants therefrom. The frame may be used or constructed for either helicopters or winged aircraft with a tail conventional for the type of aircraft for which the frame is to be used.

It is an object of the invention to construct an aircraft frame having a large side area without obstructions or braces.

Another object is to construct a frame for an aircraft including a truss forming a tail portion and a cabin portion extending over the cargo space. A floor beam is pivotally attached to the tail portion of the truss and connecting means joins or connects the forward end of the cabin portion with the floor beam.

Other objects of the invention will be more apparent from the following description when taken in connection with the accompanying drawings illustrating two forms of frame in which:

Figure 1 is a side elevation of the frame as applied to a helicopter;

Figure 2 is a top view of the frame of Figure 1;

Figure 3 is a front elevation of the frame;

Figure 4 is a perspective view of another form of frame; and

Figure 5 is a plan view in reduced size of the frame of Figure 4.

The aircraft frame particularly shown in the figures has a conventional helicopter tail portion; however, the frame is equally suitable for an aircraft of the wing type in which case the tail portion would be that of a winged aircraft. The frame comprises a truss forming a tail portion 10 and a cabin portion 11. The cabin portion is made up of a plurality of truss sections in side by side relation with an unobstructed area therebeneath. The truss sections particularly illustrated are generally rectangular with a cross beam dividing the rectangle into triangles. The side framework of the truss is made up of triangular units which are connected together by braces which generally form rectangles at the junction between the tail portion and the cabin portion. Suitable cross bracing is used where needed for torsional strength and rigidity. The forward end of the tail portion of the truss includes a vertical brace or member 12 and an inclined brace or member 13 connected therewith and connecting with the cabin portion of the truss. This inclined member 13 is the only brace of the frame or truss which crosses or obstructs the large essentially rectangular opening beneath the cabin portion. A cross brace extends between the lower end of the braces 12 upon each side of the tail portion and provides the forward lower edge of the tail portion of the truss. The upper forward end of the tail portion and the lower rear end of the cabin portion have a common link 14 or structure of which link 14 is a part forming what might be termed the connection between the two portions of the truss although it is a continuous truss. The braces 13, 14 and 15 carry a heavier load and hence are heavier members.

A floor beam 16 is a built-up frame or truss structure and is connected by a pivot or hinge 17 at its rear edge with the lower forward edge of the tail portion of the truss. That portion of the floor beam at least beneath the cabin portion has a flat surface to form a cargo deck or upon which a floor may be laid to form a cargo deck. A connecting means of any suitable form connects the forward end of the cabin portion with the floor beam, that shown being a pair of struts or braces 18, connected by a hinge or pivot 19 with a forward end of the cabin portion of the truss which is shown as a forward edge thereof. The connection of the braces 18 with the floor beam may be by a hinge or pivot means 20 or may be rigid as desired. These forward braces 18 in a helicopter are subject to tension at all times. A helicopter frame has been constructed in which the horizontal dimension of the unobstructed area is seven feet two inches long by four feet one inch high. This is large enough to pass loaded stretchers onto the floor deck. This area on each side of the frame may be closed by doors which open up the full area for insertion of cargo into the cabin and onto the floor beam or the deck thereof.

The frame described is suitable for helicopters or winged type of aircraft. For a helicopter the rotor head 21 is secured to the cabin portion of the truss and the bracing 28 provides means to support the rotor head to the truss and effectively apply its lift thereto. A motor 22 is shown carried by or mounted upon the forward end of the floor beam and forward of the cargo space which motor is connected by a shaft 23 to the rotor head. This shaft is centrally of the frame or truss so that it forms no obstruction at the side wall of the cabin for the insertion of large cargo pieces or loaded structures into the cargo space. For a helicopter a tail rotor 24 is provided. A rotor head control rod 25 for controlling the pitch of the rotor blades also is centrally of the frame so that it does not obstruct the entrance in the side wall into the cargo or loading space. Auxiliary frame work not shown is attached to the frame at least for the cockpit over the pilot seats, to which the skin or aircraft enclosure 26 is attached.

The frame described is also suitable for winged type of aircraft in which case the wings 27 are secured to the sides of the cabin portion 11 of the truss and project outwardly therefrom. Whether load carrying wings or a rotor head of a helicopter constitutes the lift means or load carrying means for the aircraft, it is the cabin portion 11 thereof to which the lift of the lifting means is transmitted to the truss and frame of the aircraft.

Figures 4 and 5 illustrate an improved construction of frame having a tail portion 30 and a cabin portion 32. In this frame, there is no obstruction to any portion of the rectangular side area or opening. It is free of all obstructions. The tail portion 30 has a forward end, formed by vertical braces 31, which is vertical throughout its length and forms the aft end of the cargo space or cabin. The lower forward edge of the tail portion of the truss carries a pivot fixture forming a part of a hinge means 35.

The cabin portion 32 of the truss is connected with the tail portion by a triangular truss section on each side formed by the braces 29 of the truss. This triangular truss section is in effect a part of the cabin portion of the truss. Cross braces 36 and 37 tie the side triangular truss sections together, brace 36 being partly cut away for clarity. The cabin portion is made up of a plurality of truss sections in side by side relation with an unobstructed area therebeneath. The truss sections particularly illustrated are generally rectangular with a cross beam dividing the rectangle into triangles. The cabin portion narrows at its forward end so that it has a width to just surround the rotor head 21 or the transmission box thereof. The rotor head may have flanges 33 which are received under braces of the cabin portion, the flange being clamped to the brace such as by a tension arm 34 which is secured to the rotor head and extends over the brace. The forward end of the cabin portion therefore is constructed or shaped generally to provide means to secure a helicopter rotor head thereto. The rotor head or the transmission box thereof may be further secured to the frame such as by bolt means 55.

A floor beam 38 has a pivot fixture completing the hinge means 35 at its rear edge for hingedly attaching it to the forward lower edge of the tail portion of the truss. The forward end of the cabin portion such as the forward lower edge is connected by suitable connecting means to the floor beam. The cabin portion carries hinge means 39 to which tension rods or braces 40 are hingedly attached, the lower ends of which rods are attached to the floor beam by hinge means 41 carried by a built up section of the floor beam located forwardly of the cargo deck or floor. These tension or connecting rods form the connecting means and are inclined members in that they connect with the floor beam at a point forwardly of the point of attachment thereof with the cabin portion of the truss. Also the connecting means or braces 40 are connected with the cabin portion at a point very close to the point of application of rotor head thrust loads. A rearward component of the rotor thrust load is applied at the pivot means 35 whenever a download is applied to any part of the floor beam. Thus the weight of the floor beam, the engine, cargo and crew acting on the inclined tension rods 40 or connecting means applies a rearward force at the hinge or pivot means at any time that the aircraft is in flight and in fact a similar force or tension exists in the tension rods or struts when the aircraft is on the ground with the result that the rearward force continues to act on the pivot means. This rearward force is applied to the longerons of the tail portion as a direct reaction of the bending moments due to the weight of the tail. In effect this means that the frame of Figures 4 and 5 acts as if it were a truss of a depth equal to the fuselage or overall depth. With the connecting means or tension rods centrally of the truss or cargo cabin, they do not obstruct the rectangular loading opening in the side wall or area of the frame. The connecting means 18 of Figure 1 may also be inclined if desired and also may be located close together centrally of the cabin portion in which case some additional bracing would be desirable.

The floor beam 38 instead of being a beam formed by braces interconnected together, may be formed by plates. The floor beam, formed of plates with plates 54 forming the cross braces, is partitioned or may be compartmentalized to form storage tanks for gasoline, oil, water and the like. The cabin portion of the truss may likewise be formed of sheet metal to form storage compartments. The floor beam 16 and the cabin portion 11 of the frame of Figures 1–3 may also be made of metal plates if desired.

The skin or enclosure for the aircraft or frame of the two forms shown, is secured to auxiliary frame work 26 of any desired construction, part of which is indicated, which auxiliary frame is attached to the truss and the floor beam. A floor or deck 43 may be laid on the floor beam which extends to the side walls of the enclosure. The rectangular loading area in the side wall, formed by the frame on each side thereof, may be closed by doors 44 such as the three shown in one side of Figure 4. Similar door structure may provide access to the cargo cabin or cargo space of the frame of Figures 1–3. When three doors are used, the center door is hinged to the edge of an adjacent door so that the entire rectangular side area may be fully opened and there are no side brace obstructions at the lower level in both forms of frame and no brace obstructions throughout the entire rectangular side area in the frame of Figures 4 and 5. It is to be understood that the cabin portion 32 of the truss of Figures 4 and 5 may be wide as that shown in the truss of Figures 1 to 3.

A further advantage of the truss of Figure 4 with the cabin portion narrowing at the forward end is that free stand-up head room is provided in the forward cabin area and on each side of the cabin portion of the truss aft of the cabin area. In addition the truss structure or its braces provides its own means for securing the rotor head thereto and does not require additional bracing; hence the truss is lighter and this improves performance of the helicopter.

Additional braces may be used where necessary or deemed desirable in both forms of frames or trusses. A diagonal brace 47 is partly shown extending diagonally across a plane rectangular truss element or structure from intersections A to B as indicative of such additional bracing to give increased truss strength. A diagonal brace 48 extending from intersection C to B extends across the diagonals of a solid or three dimensional truss element and is indicative of other such braces which may be used for torsional resistance or strength in the truss or frame. The braces 49 may be termed half braces since they extend from an intersection in the side elements of the frame to the mid position of a cross brace 50. In the truss of Figures 1–3, the diagonal brace 51 extends diagonally from a lower brace intersection to an upper brace intersection spaced rearwardly or aft from the lower intersection. The diagonal brace 52 extends diagonally from an upper brace intersection to a lower brace intersection spaced aft from the upper intersection and the lower brace intersection is the second such intersection rearwardly.

The forward end of the floor beam in both frames may be built up to provide a support for the motor and some of the framework for a pilot cabin over the motor. In the floor beam of 38 of Figure 4, the forward end may have an inclined cradle 56 for receiving the motor 22. Auxiliary framework is attached to the frame to which the skin or cabin enclosure is secured.

The connecting means 40 are shown as closely spaced bars which reduces torsional load from passing through between the forward portion of the truss and the floor beam 38. The torsional load transmitted through the connecting means 40 can be prevented by using a single bar or bringing the two bars as close together as possible such as by use of brackets 41a at each end of the connecting means. The use of two bars as the connecting means provides a safety factor.

This invention is presented to fill a need for improvements in any aircraft frame with large side openings. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. An aircraft frame comprising a truss forming a tail portion having a forward end with a lower edge and a forward upper end, and a cabin portion extending forwardly a substantial distance from the forward upper end of the tail portion and positioned above the tail portion, the cabin portion including a plurality of truss sections in side by side relation with an unobstructed area therebeneath free of all truss structure, a floor beam of truss form and having a rear end and a flat upper deck beginning at the rear end and extending forwardly at least to the forward end of the cabin portion, pivot means pivotally securing the rear end of the floor beam to the forward lower edge of the tail portion, and connecting means connecting the forward end of the cabin portion of the truss to the floor beam at a point at least as far forward as the connection of the connecting means with the truss and providing the sole connection between the cabin portion and the floor beam forwardly of the pivot means thereby leaving a large unobstructed side loading opening between the cabin portion of the truss and the deck of the floor beam.

2. An aircraft frame as in claim 1 including aircraft supporting means carried by the cabin portion of the truss.

3. An aircraft frame as in claim 1 including a mounting for a helicopter rotor head secured to the forward part of the cabin portion of the truss.

4. An aircraft frame comprising a truss forming a tail portion having a vertical forward end for the full vertical height thereof, the forward end having a lower edge and a forward upper end, and a cabin portion extending forwardly from the forward upper end of the tail portion and positioned above the tail portion, the cabin portion including a plurality of truss sections in side by side relation with an unobstructed area therebeneath free of all truss structure, a floor beam of truss form and having a rear end and a flat upper deck beginning at the rear end and extending forwardly at least to the forward end of the cabin portion, pivot means securing the rear end of the floor beam to the forward lower edge of the tail portion, and connecting means connecting the forward end of the cabin portion of the truss to the floor beam at a point at least as far forward as the connection of the connecting means with the truss and providing the sole connection between the cabin portion and the floor beam forwardly of the pivot means thereby leaving a large unobstructed side loading opening of rectangular shape between the cabin portion and the floor beam.

5. An aircraft frame as in claim 4 in which the cabin portion of the truss narrows towards the forward end thereof, and the connecting means is a pair of spaced bars located laterally with respect to each other and centrally of the frame and spaced apart within the width of the forward part of the cabin portion.

6. An aircraft frame as in claim 5 including a helicopter head secured within the narrow forward end of the cabin portion of the truss.

7. An aircraft as in claim 4 including pivot means for pivotally connecting the connecting means with the cabin portion of the truss.

8. An aircraft frame comprising a truss forming a tail portion having a forward end with a lower edge and a forward upper end, and a cabin portion extending forwardly from the forward upper end of the tail portion and positioned above the tail portion, the cabin portion including a plurality of truss sections in side by side relation with an unobstructed area therebeneath free of all truss structure, a floor beam of truss form and having a rear end and a flat upper deck beginning at the rear end and extending forwardly at least to the forward end of the cabin portion, pivot means securing the rear end of the floor beam to the forward lower edge of the tail portion, and connecting means pivotally connected with the forward end of the cabin portion of the truss and pivotally connected with the floor beam at a point at least as far forward as the connection of the connecting means with the truss and providing the sole connection between the cabin portion and the floor beam forwardly of the pivot means thereby leaving a large unobstructed side loading opening between the cabin portion and the floor beam.

9. An aircraft frame as in claim 8 in which the connecting means is connected with the floor beam at a point forwardly of the connection of the connecting means with the cabin portion whereby the connecting means is inclined.

10. An aircraft frame as in claim 8 in which the connecting means is connected to the floor beam centrally of the width thereof.

11. An aircraft frame as in claim 8 in which the cabin portion of the truss narrows to its forward end forming means at the forward end to support a helicopter rotor head and the connecting means has a width comparable to the widths of the forward part of the cabin portion.

12. An aircraft frame as in claim 8 including supporting means carried by the cabin portion of the truss to support a rotor head, the connecting means being connected with the floor beam forwardly of the connection of the connecting means with the cabin portion of the truss whereby the connecting means is inclined fore and aft, and the connecting means being attached to the cabin portion adjacent to the rotor head supporting means.

13. An aircraft frame as in claim 12 in which the cabin portion of the truss narrows forwardly, the supporting means being at the forward end of the cabin portion, and the connecting means being secured centrally of the width of the floor beam.

14. An aircraft frame and fuselage comprising a truss forming a tail portion having a forward end with a lower edge and a forward upper end, and a cabin portion extending forwardly a substantial distance from the forward upper end of the tail portion and positioned above the tail portion, the cabin portion including a plurality of truss sections in side by side relation extending forwardly with an unobstructed area therebeneath free of any truss structure, the cabin portion narrowing forwardly from the tail portion, a floor beam of truss form having a rear end and a flat upper deck extending from the rear end and forwardly at least as far as the forward end of the cabin portion, the floor beam and deck having a width at its rear end substantially the same as the forward portion of the tail portion and at least the same width forwardly, pivot means pivotally securing the rear end of the floor beam to the forward lower edge of the tail portion, connecting means connecting the forward end of the cabin portion of the truss to the floor beam at a point spaced from the rear end thereof and providing the sole connection between the cabin portion and the floor beam forwardly of the pivot means thereby leaving a large unobstructed side loading opening between the cabin portion of the truss and the deck of the floor beam, and a fuselage mounted on the truss and floor beam and having side walls extending vertically along the sides of the deck to the top of the cabin portion of the truss.

15. An aircraft frame comprising a truss forming a tail portion having a forward end with a lower edge and a forward upper end, and a cabin portion including a plurality of truss sections in side by side relation extending forwardly a substantial distance from the forward upper end of the tail portion and positioned above the tail portion and free of truss structure therebelow, a floor beam of truss form and having a rear end and a flat upper deck beginning at the rear end and extending at least as far forward as the forward end of the cabin portion, pivot means pivotally securing the rear end of the floor beam to the forward lower edge of the tail portion, and connecting means connecting the forward end of the cabin portion of the truss to the floor beam at a point at least as far forward as its connection with the cabin portion of the truss and providing the sole connection between the cabin portion and the floor beam forwardly of the pivot means thereby leaving a large unobstructed side loading opening between the cabin portion of the truss and the deck of the floor beam.

References Cited in the file of this patent

UNITED STATES PATENTS

| | | |
|---|---|---|
| 1,889,294 | Rosatelli | Nov. 29, 1932 |
| 2,155,881 | Wilford et al. | Apr. 25, 1939 |
| 2,476,538 | Fowler | July 19, 1949 |

FOREIGN PATENTS

| | | |
|---|---|---|
| 553,388 | France | Feb. 9, 1923 |
| 620,863 | Great Britain | Mar. 31, 1949 |

OTHER REFERENCES

"American Helicopter," issue of August 1948, pages 14, 15, 244–17 pub.

"Jane's All the World's Aircraft," 1950–1951, page 282c.

Grimm: "Secondary Stresses in Bridge Trusses," John Wiley & Sons, New York, 1908, pp. 1 and 2.